July 1, 1947.  J. KOPP  2,423,191
CONTROL APPARATUS FOR VARIABLE PITCH PROPELLER ADJUSTING DEVICES
Filed Aug. 3, 1943  6 Sheets-Sheet 5

Inventor:
Jean Kopp
by Sommers-Young
Attorneys

Patented July 1, 1947

2,423,191

UNITED STATES PATENT OFFICE 2,423,191

CONTROL APPARATUS FOR VARIABLE PITCH PROPELLER ADJUSTING DEVICES

Jean Kopp, Berne, Switzerland

Application August 3, 1943, Serial No. 497,190
In Switzerland June 18, 1942

9 Claims. (Cl. 170—163)

This invention relates to control apparatus for variable pitch propeller adjusting devices. It is particularly well suited for aircraft propellers but may serve for ship propellers and fans with adjustable blades as well.

Hitherto, in aircraft propellers with more than one blade adjusting range the propeller is either actuated, by means of the motor control lever, or the governor control lever, or operation of the propeller is combined with the control lever of the motor, and a separate device is employed for adjusting the propeller into the end position, which adjustment is effected by a separate lever. Most of the variable pitch propellers hitherto used are equipped only with an adjusting range which is automatically controlled by the governor, and the vane position.

In propellers with braking position the conventional control devices are not satisfactory for the reason that the control for bringing about the braking position involves considerable risk. In such arrangements either only the motor control lever or the governor control lever can be operated at a time. As, however, just in the course of the braking operation the attendance of the motor and the adjustment of the propeller must be simultaneously effected it may easily happen that in using any of the known devices an error of control may be made which may have serious consequences. Further the pilot must pay full attention to the separate control operations required to be performed so that he is liable to lose full control of the aircraft in making a landing. In the event of impediments suddenly arising while making a landing the said drawback is particularly annoying for the reason that the control of the motor in starting again must be effected in adaptation to the operation of resetting the propeller and that it is impossible for the pilot to control two levers at the same time.

In the control apparatus according to the present invention these drawbacks are eliminated, the control of the propeller is simplified, and erroneous control operation of the propeller is done away with.

The control apparatus according to the present invention is distinguished by the arrangement of a control lever which is connected with the adjusting device in such manner that by controlling the lever all the adjusting ranges provided for the propeller, such as those for establishing the braking position, automatically varying the blade pitch, and establishing the feathered position, can be controlled as well as transmission means that are connected with the control lever and determine the extent and the velocity of adjustment of the propeller blades.

This control apparatus can be actuated by means of a pressure fluid, or electrical connecting means which is influenced by the control lever in such fashion that all the adjusting ranges of the propeller can be controlled by electrical energy.

Several embodiments of the invention are illustrated, by way of example only, in the accompanying drawings in which.

Figure 1:
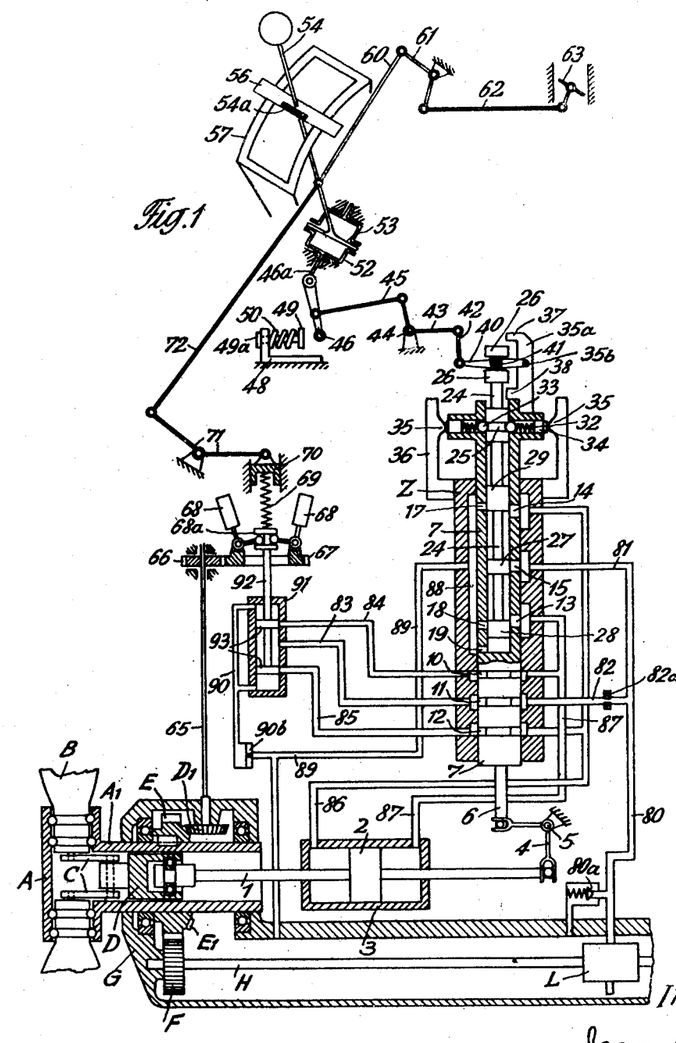
Fig. 1 is a schematic lay-out of a control apparatus according to the invention with the parts in position of normal automatic adjustment.

In the embodiment of the invention schematically illustrated in Fig. 1 the character A denotes the hub of the propeller providing a mounting accommodating the blades B for rotation about their own axes in a manner known per se. The cylindrical extension $A_1$ of the hub A is rotatably mounted in the motor casing. To this extension $A_1$ a gear E is keyed which is in mesh with a gear F which is integral with the driving shaft H. The driving shaft may be the crankshaft of the motor itself or some other driving shaft for driving the propeller through the gears F, E. On the side of the propeller blade base adjacent to the middle of the hub a crank pin is arranged on the blade base which by means of connecting rods C rotates the propeller blades about their own axes by an axially displaceable sleeve D, in a known manner.

By means of a ball bearing which is adapted for transmitting axial forces the sleeve D is connected with the piston rod 1. The piston rod 1 is fixed with respect to the piston 2 contained in a cylinder 3. The piston 2 is axially displaceably arranged in the cylinder 3 and separates this cylinder into separate spaces into which lead passages 86 and 87. An extension of the piston rod 1 is articulated to a bell crank lever 4 which is fulcrumed on a fixed point 5. The second arm of the bell crank lever 4 is connected with an extension 6 of an adjusting sleeve 7. The adjusting sleeve 7 is axially displaceably mounted in a casing Z and is provided with a number of grooves serving for the control of oil. In the interior of the adjusting sleeve 7 a control piston 24 is displaceably mounted which is likewise provided with reduced portions serving for the control of oil. In prolongation of the adjusting sleeve 7 an arresting device is arranged which is composed of balls 33, springs 32 and bolts 34. The springs 32 urge the balls 33 into an annular throat 25 in the control rod 24 and maintain these in position so that the control rod 24 can not shift relative to the adjusting sleeve 7 without being influenced from without. The bolts 34 are supported by cams 35 of a guide 36 which is fixed to the casing Z. The upper portion of the control piston 24 is in the form of a control collar. Between shoulders 26 of the control piston 24 a reduced portion is arranged in which engages a bolt 41 on a lever 40. The lever 40 is rotatably mounted on a part 35a which is integral with the control sleeve 7. The part 35a is provided with two stops 37, 38 for limiting the axial displacing movement of the control piston 24. The free end of the lever 40 is connected with a strap 42 which in turn is connected with one of the arms of a bell crank lever 43 which is fulcrumed on a fixed point 44.

The second arm of the bell crank lever 43 is connected with a connecting rod 45 which in turn is connected with a lever 46. The lever 46 is keyed to an axle 46a of a framelike articulation 52. In the transverse direction to the axle 46a in the frame 52 an axle 53 is mounted which is integral with a control lever 54. The axles 46a and 53 constitute a universal joint. A stop 49 is juxtaposed to the end of the lever 46 in such manner that the lever 46 can freely move to a certain extent until it comes to bear against the stop 49. The stop 49 is yieldingly pressed toward lever 46 by means of a spring 50 which engages a fixed piece at one end. The position of the stop 49 is normally determined by a head 49a on one end of the stop which engages the fixed piece and limits movement of the stop toward the lever 46.

Due to being mounted by means of a universal joint the control lever 54 is free to move in a frame 57 in two directions. In moving in the longitudinal direction of the frame the control lever 54 rotates about the axle 53 and in moving transversely of the frame 57 this lever rotates about the axle 46a. The adjusting movement of the control lever 54 in the longitudinal direction serves for actuating a flap controlled throttling member for the motor, thereby serving as an operating lever for the motor. The operative connection between the control lever 54 and the throttling member 63 includes a rodwork 60, 61, 62. The adjusting movement of the lever 54 transversely to the frame 57 serves for adjusting the pitch of the propeller. The control lever 54 is situated at the pilot's seat of the aircraft. Above the frame 57 a bar 56 is arranged which is firmly connected to the control lever 54 and by means of which the position of the lever 54 can be determined as regards the longitudinal as well as the transverse direction. The driving wheel E of the propeller is provided with an additional tooth system E1 which cooperates with a bevel wheel D1. The axle 65 of the bevel wheel D1 is mounted in a casing G and serves for driving a governor comprising a gear 67, centrifugal weights 68, a control collar 68a and a spring 69. The drive is effected from the axle 65 and transmitted to a gear 66 keyed to the axle 65 and thence transmitted to the gear 67.

Figure 2:
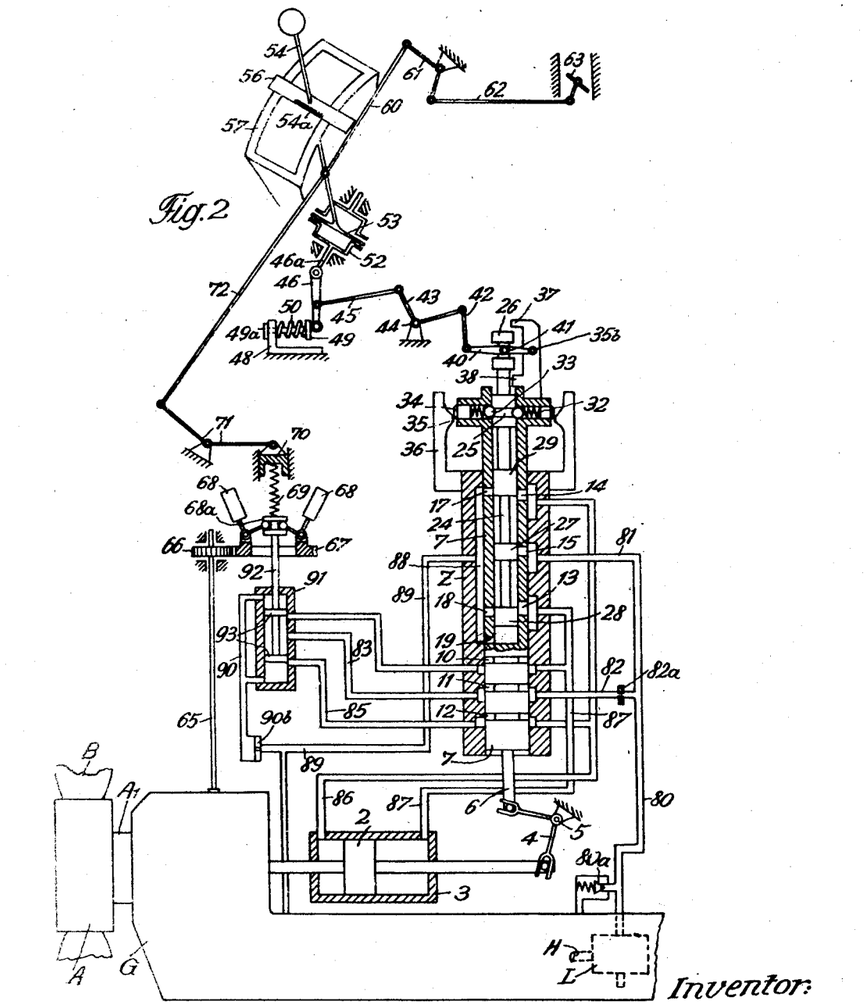
Fig. 2 is a schematic lay-out of the control apparatus with the parts at the limit of the automatic adjustment range.
Figure 3:
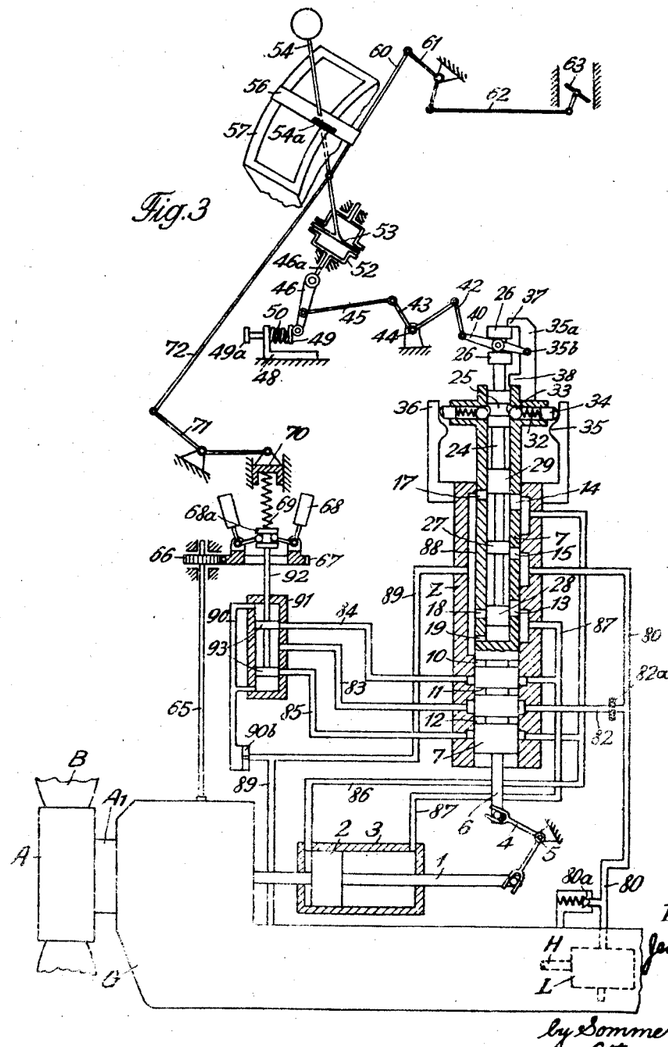
Fig. 3 is a schematic lay-out of the control apparatus with the parts adjusted for establishing the end position.

The governor is a centrifugal governor of a suitable known type and functions to adjust the speed of revolution of the propeller to a constant value. The arms of the centrifugal weights 68 interengage with the collar 68a which is rigidly connected to a control piston 92. The control piston 92 is displaceably arranged in a sleeve 91 and provides a seal with the sleeve 91 by means of two collars 93 for controlling the flow of oil from a passage 83 to passages 84 or 85 respectively. The collar 68a abuts against a spring 69 which in turn abuts against a part 70 slidably mounted in a fixed part. Through the rodwork 71, 72 the part 70 can be axially shifted, whereby the spring 69 can be compressed or relieved. By this means the governor can be adjusted to a smaller or greater speed of revolution. The operation of the control apparatus as shown in Figs. 1 to 3 is as follows:

Three operative positions are provided for the propeller:

1. An automatic range for the normal operation. The propeller is provided with positive blade adjusting means. The speed of revolution of the propeller decreases or increases dependent upon the load on the propeller. The adjusting system is so influenced by the governor that the pitch of the propeller blades becomes larger or smaller until the speed of revolution of the motor has assumed the value for which it has been adjusted. Within this automatically controlled adjusting range the pitch of the propeller blades can be varied within an angular range of approximately 40 degrees.

2. The negative position. The propeller can be adjusted into a negative blade position in which forward thrust is no longer produced, the thrust produced being in the rearward direction. In connection with aircraft this adjustment is known as the so-called braking position due to the fact that the aircraft is thus braked so that its speed is reduced. In connection with ship propellers the ship can be slowed down or run backward with this adjustment of the propeller.

3. The altogether positive position. The blade pitch of the propeller is so great that the web of the blade extends in the direction of running. This position is of particular importance with aircraft having several motors in order that in case of breakdown of one motor the resistance of the then immovable propeller can be reduced.

For preventing accidents it is imperative to avoid that the propeller can be automatically adjusted out of the normal automatic adjusting range into the negative, so-called braking position or into the altogether positive, so-called feathered position. The automatic adjustment must not be carried beyond a predetermined range, that is, must be limited. The adjustment into the end positions must be effected by arbitrary extraneous influence on the operation of the propeller.

1. Automatic control (Fig. 1)

On the driving shaft N of the propeller an oil pump L is arranged. The pump L withdraws oil from the motor casing or a reservoir and forces the oil into a conduit 80. An overpressure valve 80a maintains the pressure in the conduit 80. The oil passing through the overpressure valve flows back into the motor casing. From the conduit 80 the oil flows to a throttling valve 82a and therethrough into a conduit 82. This throttling valve gives passage only to a smaller amount of oil for preventing the velocity of adjustment by the automatic control from becoming too high. From the conduit 82 the oil flows to a control slot 11 in the adjusting sleeve 7 and thence through a conduit 83 to the control piston of the governor.

Pressure oil also flows through a conduit 81 from the pump L to a slot 15 of the adjusting sleeve. Within the automatically controlled adjusting range passage of oil is however prevented by the collar 27 of the control piston 24.

If the speed of revolution to which the governor is adjusted corresponds with the speed of revolution of the propeller the control collars 93 of the control piston 92 cover the discharge openings in the control sleeve 91 and the conduits 84 and 85 remain closed. As the speed of revolution of the propeller rises above that for which the governor is adjusted the spring 69 is compressed by the increase of centrifugal force exerted by the centrifugal weights 67 (Fig. 2). Thereby the control piston 92 is displaced upwardly and gives free passage of pressure oil by the upper control collar 93 from the conduit 83 into the conduit 84. From the conduit 84 pressure oil passes through the slot 10 of the adjusting sleeve 7 into a passage 87 and through same into the cylinder 3. Under the influence of the oil pressure the piston 2 is adjusted, thereby adjusting, through the piston rod 1, the sleeve D and the crank C of the propeller blades in such direction that the pitch angle of the blades is increased. By effect of this increased pitch the propeller blades are subjected to a greater resistance, whereby the speed of revolution of the motor and that of the propeller tends to decrease. The adjustment is maintained until the speed of revolution of the propeller corresponds again to that for which the governor has been adjusted, whereupon the control piston 92 of the governor returns into normal position and the passages 84 and 85 are closed again. The oil present at the opposite end of the piston passes through the passage 86 into the slot 12 of the control sleeve 7 and thence through the conduit 85 into the sleeve 91 of the control piston and through the return passage 90 and a nozzle 90b into the conduit 89 and back into the motor casing.

The same operation, however in reversed sequence takes place when the speed of revolution of the propeller decreases below the value of the speed of revolution for which the governor has been adjusted. In this case the pressure oil passes from the conduit 83 into the conduit 85 and through the slot 12 and the conduit 86 towards the other end of the piston 2.

Fig. 2 shows the condition of the control apparatus at the limit of the automatic adjustment range.

The adjusting movement of the piston 2 and thus that of the propeller blade is positively transmitted through the bell crank lever 4 to the extension 6 of the adjusting sleeve 7. For the purpose of limiting the automatic adjustment range the control slots in the adjusting sleeve 7 are so arranged that the oil supplied by the governor to the piston 2 is stopped due to the positive adjustment of the sleeve 7 when the propeller has reached the end of the automatic adjusting range. If the pressure oil supply is effected, for example by the passage 84, the control slot 10 is shut through movement of the piston 2 (to the left in the drawing) and of the sleeve 7 upwardly, and the pressure oil supply ceases. The propeller then can not be further adjusted by the governor in this direction. However, the control slots 11 and 12 still remain open in this position of parts for the purpose of making resetting in the opposite direction possible. The same operation takes place in adjusting in the other direction, when pressure oil is supplied through the passage 85. The passages 10 and 11 still remain somewhat open until the passage 85 is shut by means of the slot 12, whereupon the propeller is limited also in this direction.

The shifting movement of the piston 2 and of the adjusting sleeve 7 is transmitted through the arresting device 33, 32, 34 also to the control piston 24. Due to the fact that the part 35a is integral with the control sleeve 7, the lever 40 is displaced together with the adjusting sleeve in parallelism with itself either upwardly or downwardly without effecting any rotational movement about the fulcrum 35b. The displacing movement is transmitted from the lever 40 to the lever 42 and from the latter through the lever 43 and the rod 45 to the lever 46. Consequently the lever 46 is turned about its axle 46a, thereby pivotally adjusting the control lever 54 in the direction transversely of its axle 53. The rodwork 60 for operating the fuel throttling member is however not influenced by this transverse movement. In the position at the end of the automatic range the lever 46 contacts with the stop 49. The control lever 54 shares, due to this positive guidance, in the whole adjusting movement of the propeller by effecting its transverse movement. A mark 54a on the bar 56 of the lever 54 permits one to determine the automatic adjustment range indicated by it.

The normal automatic adjusting range is approximately only one-third of the whole range of adjustment of the propeller. Within this automatic range the arresting bolts 34 ride up on the cams 35 of the guide 36. The springs 32 are thus compressed so as to vigorously force the arresting balls 32 into the groove 25 of the control piston 24, which can be displaced towards the arresting device and thus towards the adjusting sleeve 7 only by a strong pull on the lever 40 caused by a vigorous lateral thrust exerted on the lever 54. Only after further adjustment beyond the automatic adjusting range do the bolts 34 move beyond the cams 35 in the outward direction in their guides, whereby the energising of the springs 32 and consequently the grip of the arresting device is released (Fig. 3). Two arresting devices are arranged in opposed relation to each other for the purpose of avoiding lateral pressure on the control piston 24. This arrangement serves to prevent the control lever 54 from being inadvertently adjusted beyond the normal automatic range.

Within the normal automatic adjusting range for the propeller, as controlled by the governor, the velocity of adjustment must not be too great but should be limited to a certain value in order to prevent excessive oscillatory control movement and consequently improper adjustment from setting up. The adjustment into the end positions must however be effected as quickly as possible in order to avoid conditions of operation of the propeller that are liable to invite accident. This may, for example, happen during passing over from positive to negative adjustment of the blade webs. In the position in which the blade face of the propeller extends in the direction of rotation the motor is most liable to run wild due to the fact that the face then opposes only slight resistance to it.

In order to limit the velocity of adjustment of the automatic control in the pressure conduit 82 leading to the governor a throttling valve 82a is included which functions so as to permit only a limited amount of oil to pass through for effecting the adjustment by the governor. For the adjustment into the end positions, however, the whole supply of the oil pump L is available in consequence whereof the adjustment into the end positions takes place at much higher velocity. The relation between the two adjusting velocities can be chosen at will.

The adjustment of the propeller into the end positions (braking or feathered position) is effected as follows:

By reference to Fig. 3 it will be observed that for setting, for example, the braking position from the position of the propeller within the automatic range the lever 54 is pivotally adjusted in the transverse direction of the frame 57 by exerting vigorous lateral pressure on the lever 54. By means of the universal joint 52, the lever 46, the rodwork 45, 43, 42, and the lever 40, the control piston 24 is pulled out of engagement with the arresting device 33, 32, 34 until the stop 26 of the control piston hits the stop 37. Due to the displacing movement of the control piston 24 towards the adjusting sleeve 7 the collar 27 of the control piston 24 gives free passage to the oil to flow from the conduit 80 through the slot 15 to the control piston 24. The supply of pressure oil from the pump L passes from the control piston to the slot 13 and thence through the conduit 87 to the cylinder 3 so that the piston 2 and consequently also the propeller is readjusted.

As long as the propeller is still set for adjustment within the automatic range the pressure oil in the conduit 87 can still pass to the slot 10 and beyond the latter into the conduit 84. If the governor, which also functions during the arbitrary adjustment into the end positions to some extent, had opened the passage 84 into the return conduit the pressure oil would pass from the conduit 87 into the return conduit instead of the piston 2. In order to prevent too much of this flow, in the return conduit 90 a constriction 90b is provided which gives passage only to a slight amount of oil. Since, as precedingly described, within the automatic range controlled by the governor the adjusting operation requires only a small amount of oil this constriction 90b is of only negligible influence in this range. In adjusting into the end positions, however, a large amount of oil is available, so that loss of oil through this constriction has no serious influence for the reason that this happens only when the propeller is still set for the automatic range and only under such conditions that the governor slowly makes free the return conduit. The slots 10, 11 and 12 are shut from the passage of oil when the adjusting of the propeller is effected beyond the normal automatic range, while at the same time the supply of oil towards and away from the governor is stopped and the governor still idles with the propeller.

The oil pressure in the conduit 87 effects adjustment of the propeller as long as the control lever 54 is pushed aside. The lever 54 then shares in the adjusting movement of the propeller by pivotal adjustment in the lateral direction owing to positive adjustment of the control sleeve 7 by means of the resetting parts 4 and 6. This gives to the pilot at each moment an indication of the extent and velocity of the adjustment. Shortly before reaching the end of the movement into the end position the lever 54 comes to bear laterally against the frame 57. The adjusting movement keeps however on and the sleeve 7 adjusts itself further upwardly as in Fig. 3. The rodwork 46, 45, 43, 42 however remains at stand-still as the lever 54 comes into lateral bearing engagement with frame 57. The lever 40 pivots about the fulcrum 35b. The control piston 24 moves downwardly relative to the adjusting sleeve 7 and on reaching the median position stops the flow of oil through the slot from the pressure conduit 81 by means of the collar 27 so that the adjusting movement in this direction ceases. The oil present at the other end of the piston, which during this adjustment is expelled, passes through the conduit 86 to the slot 14 of the sleeve 7, by way of the control piston 24 to the slot 17, into the passage 88 and into the conduit 89 which conveys the oil back into the motor casing or reservoir. Exactly the same operation takes place when the propeller is adjusted into the other end position, except that the movements take place in reversed sequence.

With a view to obtaining the feathered position of the propeller the lever 54 is forced toward the left with regard to Fig. 1 of the drawings and the control piston 24 moves downwardly as shown. Pressure oil passes from the conduit 80, 81 through the slot 15 and through the control piston into the slot 14 and thence through conduit 86 to the cylinder 3. The oil returning from the cylinder 3 passes through the conduit 87, through the slot 13, through the control piston into the slot 18, and thence to the passage 88 and back into the motor casing through the conduit 89.

In the casing Z at the port openings of the slots 13, 14, 15 in the adjusting sleeve 7 leading into the conduits 87, 81, 86 recesses are arranged which are of such width that the passage of oil from the conduits to the slots in the adjusting sleeve is ensured in each position of the adjusting sleeve 7. The space formed between the lower end of the adjusting piston 24 and the adjusting sleeve 7 is vented into the return passage 88 through the slot 19 in order to avoid the setting up of back pressure on the control piston.

As previously described a vigorous lateral thrust must be exerted on the control lever 54 for the purpose of displacing the propeller into the end positions as long as the propeller is set for the automatic adjusting range. As soon as this range is passed the spring arresting device 33, 32, 34 is released. The pilot immediately feels in his hand that the setting to the end position adjustment has now been effected. The mark 54a on the bar 56 indicates this setting at the same time.

For adjusting the propeller back out of and end position into the normal automatic adjusting range the control lever 54 is pressed to move in the opposite direction. By means of the rodwork and the levers 46, 45, 43, 42 the control piston 24 is also urged in the opposite position. The supply of oil to the cylinder 3 is reversed, the opposite end of the piston is subjected to the oil pressure so as to readjust the propeller again at the same velocity back into the end position. If for example the lever 54 is urged from the braking position shown in Fig. 3 towards normal position the control piston 24 is forcibly shifted from the upper stop to the lower stop, whereby pressure oil passes from the conduit 81 through the slot 15 via the control piston 24 to the slot 14 and thence to the cylinder 3 through conduit 86.

The adjusting sleeve 7 is lowered by effect of the readjustment of the piston 2 toward the right until the lever 54 is reset. On arrival within the normal automatic range the arresting device 33, 32, 34 operates automatically again so as to force the control piston 24 into median position unless still further counter pressure is supplied by the pilot. This arresting device is so constructed as never to stop functioning altogether. The recessed portion 25 in the control piston 24 is so wide that the balls 33 can never move out of this recessed portion altogether. By this means the arresting device is automatically put into operation again when the automatic range has been reached.

The construction of the control piston and that of the connecting rodwork arranged between this piston and the control lever is such that the control lever 54 is required to travel only through a very short stretch for adjusting the control piston relative to the adjusting sleeve 7 and effecting the setting for adjustment in the opposite direction. This permits of determining the amount of adjustment effected, by the pilot in an exact manner. The control lever 54 is prevented from arriving into position of automatic adjustment before the propeller itself is in this position. The arresting device snaps into engagement immediately as the lever 54 comes into position of automatic control. The propeller is prevented from returning from end position adjustment into normal position of automatic adjustment, by itself. The governor is completely disconnected as long as the end position adjustment continues due to the shutting of the slots 10, 11, 12 by the adjusting sleeve 7 (Fig. 3). Readjustment in the opposite direction can be effected only by adjusting the control piston 24 into the opposite position, for example in the direction from above in Fig. 3 into the lower position so that the stop collar 26 on the control piston bears against the stop 38 of the guide 35a. This adjustment, that is displacement of the control piston 24 is effected by resetting the lever 54 in the direction towards the setting for automatic adjustment. The resetting of the propeller takes place at the same velocity as the adjustment into the end position for the reason that also for the return setting the full amount of oil supplied by the pump L is available.

In adjusting the propeller into an end position the pilot must give full attendance to the propeller, particularly in adjusting to the braking position. If braking is applied in making a landing of the aircraft the braking operation must not begin prematurely as otherwise the aircraft might pancake while still up in the air and might thus hit the ground roughly. The braking operation must also not begin too late as otherwise in rolling out on a short landing place the aircraft might roll beyond the extent of the landing place. Further the pilot must be enabled if impediments suddenly arise to readjust the propeller from the braking position into starting position, that is position of automatic adjustment, as quickly as possible. Incidental to this rapid readjustment it is imperative for the pilot to know in what time the propeller will be readjusted for preventing the aircraft from being zoomed too early. By the positive indication of the propeller adjustment of braking or driving position by the control lever 54 which serves at the same time as the operating lever for the motor the braking to be effected by the pilot is greatly facilitated.

In order to provide for additional safety by preventing the motor operating lever remaining in braking position due to inadvertence on the part of the pilot at the end of the lever 46 the resilient stop member 49 is arranged. Within the normal automatic range the lever 46 swings freely until it hits the stop member 49. As soon as the lever 46 has reached the end of the automatic range this lever bears against the stop member 49. The member 49 is maintained in the position shown in Fig. 2 by the spring 50 being under initial stress. The shoulder 49a being fixed with respect to the stop member 49 prevents the spring 50 from becoming entirely relieved of stressing. After the propeller is manually adjusted into braking position back pressure is exerted on the lever 46 by the spring 50 which back pressure must be overcome by effort exerted by the pilot on the control lever 54. This back pressure increases as the propeller approaches the end position. By effect of this back pressure the pilot is made aware that the braking position has been set. The value of this back pressure is such that on releasing the control lever 54 the latter is readjusted backwardly towards the automatic range and the propeller is also readjusted into position for automatic adjustment within said range. The back pressure is, however, not as great as the pressure required for overcoming the resistance opposed by the arresting device 33, 32, 34 within the automatic range, for the purpose of indicating to the pilot that the limit of the automatic range has been passed.

Adjustment of the propeller into feathered position is effected only when a motor of a multi-engined or also of a single motor aircraft has damaged, for the purpose of reducing the resistance set up by the propeller which is at rest, and for preventing further damage to the motor by the propeller continuing to move. The automatic resetting of the control lever can be dispensed with in this position since this position is required to be retained until the landing has been effected. For this reason no resetting operation by the resetting device is required in this direction.

The control operation for adjusting the propeller into either of the end positions has no influence on the fuel control rodwork 60, 61, 62 connected with the lever 54 and on the throttling member 63 due to the fact that the adjustment of the lever 54 takes place transversely of the longitudinal direction of the rod 60 and the length of the rod 60 is very great relative to the transverse movement thereof. The operation of adjusting into the end positions can take place in any position of the control lever in the direction for supplying fuel and at any speed of revolution of the motor. It is, for example, also possible to supply fuel and to operate the brake at the same time or to operate the brake and stop the fuel supply. Any suitable combination of adjustments into the end positions and fuel control can be made for the reason that both operations are entirely independent of each other.

The setting of the governor, for constant speed of revolution can be effected by means of the motor operating lever directly, as illustrated in Figs. 1 to 3, as the pilot as a rule desires to maintain constant whatever speed of revolution he has set by the motor operating lever for the purpose of preventing overloading of the motor which might take place if the governor had, for example, been adjusted for low speed of revolution and suddenly full throttle is given so that the motor might run wild.

Figures 4, 5, 6:
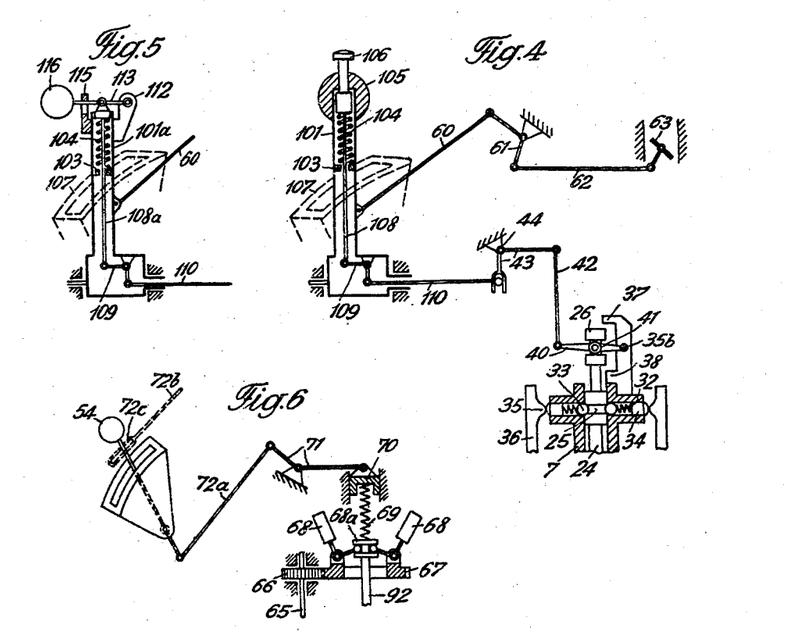
Fig. 4 shows a modification of the control means.
Fig. 5 shows a further modification of the control means of the control apparatus.
Fig. 6 is a view of a modification of the governor actuating means.

The control of the governor may, however, as illustrated in Fig. 6, also be separately effected by a separate control lever. A modification of such an arrangement and the one precedingly described may be resorted to as indicated in dotted lines in Fig. 6 in which the governor control rodwork associated with the motor of the operating lever 72b is provided with a slot 72c in which the governor adjusting lever 54 can freely move to a certain extent.

Instead of pivotally adjusting the fuel lever in the lateral direction for setting into an end position of the propeller, this setting may be effected by means of a control button as shown in Fig. 4 which button projects from the motor operating lever and can be operated by means of the thumb of the pilot's hand. In this arrangement the motor operating lever 101 moves in a guide 107 in a single plane. A spring 104 which abuts against a shoulder 103 on the motor operating lever urges the button 106 outwardly into the position shown. A rod 108 is rigidly connected with the button 106 and is articulated at its lower end to a bell crank lever 109. By means of the rod 110, a bell crank lever 43, and a rod 42 the control piston 24 is connected with the control button. Due to the fact that the rod 110 passes through the fulcrum of the motor operating lever 101 adjustment of the gas lever has no influence on the control of the control piston. By depressing the button 106 the control piston 24 and thus the propeller is adjusted on the same principle on which the arrangement shown in Figs. 1 to 3 is based. In the first place the automatic range must be passed by vigorous pressure exertion on the button 106 and consequent releasing of the control piston 24 from the grip of the arresting device 32, 33, 34, whereupon only an adjustment into an end position can take place. The button 106 positively shares in the adjusting movement of the propeller. Readjustment out of the end position is effected by means of the spring 104 when the button 106 is released in the same manner as shown in Figs. 1 to 3 for the resetting device 49, 50, 48.

The arrangement shown in Fig. 4 only serves for adjusting the propeller into an end position, for example, into braking position, for the reason that the button 106 would have to be moved in the opposite direction, that is, pulled outwardly, for adjusting into the other end position, which would be difficult. In the position shown in Fig. 4 the apparatus is set for automatic adjustment.

Fig. 5 shows a modification of the motor operating lever illustrated in Fig. 4. In this arrangement the button 116 of the control lever is not connected to the motor operating lever 101a directly but to a lever 113 which is pivotally mounted on a support 112 of the motor operating lever. The support 112 is fixed to the motor operating lever 101a. The operation of the propeller is effected by depressing the button 116, whereby a rod 108a, which is articulated to the lever 113 is depressed and the propeller is operated in the same manner as explained in connection with Fig. 4. A spring 104 serves again for resetting the propeller, and a guide 115 serves for limiting the travel of the button 116 upwardly. The button 116 can be arranged for movement in a direction for either opening or closing the throttle. The motor operating lever proper is controlled by this button at the same time. By depressing the button 116 the operation of the propeller is effected, and by pushing the button the operation of the throttling member associated with the motor is obtained. Also, in this arrangement, the position of the button 116 corresponds to that of the propeller and thus indicates the latter.

Figure 7:
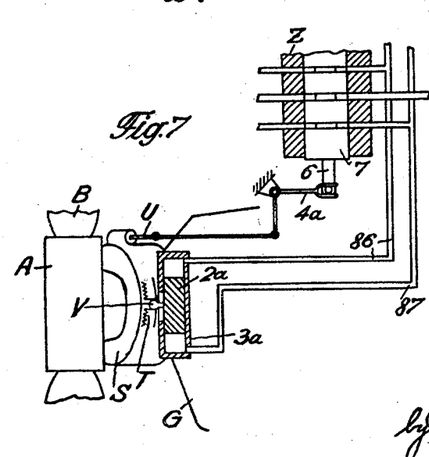
Fig. 7 is a view of a further modification of the control apparatus.

In the arrangement shown in Figs. 1 to 3 the adjustment of the propeller is effected directly by the piston 2. Instead of effecting this adjustment directly it may also be effected indirectly by means of a suitable gearing. Fig. 7 shows an arrangement of this kind. On the propeller shaft A is mounted a gearing S which transmits the energy required for adjusting the propeller by deriving it directly from the propeller itself. The reference character G designates the motor casing, T the adjusting collar of the gearing, by displacement of which the gearing is so adjusted that the propeller is set for increasing or decreasing the speed of revolution, by the propeller blades being inclinedly adjusted into steep or flat position. The reference character U refers to means for indicating the position of the propeller blades. In the adjusting member of the gearing projects a driving member V which is integral with the piston 2a which is arranged in a cylinder 3a for axial displacement. The cylinder 3a communicates at one end of the piston with a conduit 86 and at the other with a conduit 87 in a manner similar to that shown in Figs. 1 to 3. The position indicator U is linked with a bell crank lever 4a and by means of the latter with a rod 6 and a control sleeve 7. This control or adjusting sleeve 7 and consequently also the entire arrangement for operating the propeller, thus, shifts in accordance with the positioning of the propeller in exactly the same manner as described in connection with Figs. 1 to 3. The operation of controlling the propeller is based on exactly the same principle as explained in connection with the arrangement shown in Figs. 1 to 3. The oil pressure derived from the pump L does, however, not serve for adjusting the propeller directly but for influencing the piston 2a. The piston 2a adjusts the adjusting member of the gearing, whereby the gearing operates to adjust the propeller blades. The governor is actuated from the motor by driving means not shown, and the oil required for this purpose is withdrawn from the motor by the pump L, similarly as in Fig. 1.

The oil pressure necessary for influencing the piston 2a in Fig. 7 may be relatively small as only the gearing needs to be adjusted. For effecting the control of the apparatus motor lubricating oil pressure may be used throughout which pressure serves for lubricating the bearings of all the motors. By this means the pump L otherwise provided for the control apparatus may be dispensed with. The gearing S may be of any suitable type.

The apparatus for controlling the propeller may be used in connection with any propeller system operating with resetting, that is, which is provided with means for indicating the positioning of the propeller blades. The arrangements shown in the drawings represent only exemplifications of the apparatus.

The apparatus may also be employed for the control of ship propellers in the same manner and also for the control of the vanes of fans that are adjustably arranged.

The apparatus may also be used for the control of infinitely variable speed gears for machines of any kind.

Instead of the throttling valve 82a a reduction valve of conventional construction may be used which operates to admit pressure fluid to the conduit 82 only up to a certain pressure. In such an arrangement the automatically controlled range would be operated by a lower operating pressure in consequence whereof the velocity of adjustment of the propeller would be reduced compared with that of the arbitrary adjustment into the end positions.

The actuation of the throttling valve of the motor may also be effected by a separate lever so that by the control lever proper only the propeller as such and the governor is adjusted.

In propellers operating by means of an automatic adjusting range or which are adjusted by hand the resetting of the propeller adjustment may be derived directly from the motor control lever so that auxiliary control means can be omitted. In such an arrangement the lateral pivotal adjustment of the motor control lever would serve only for indicating the position of the propeller. The entire control apparatus can be combined with the control means for the propeller into a self-contained unit. Instead of using a ball operated arresting device 32, 33, 34, which is herein shown only by way of example, an arresting device of any suitable type may be employed.

Figure 10:
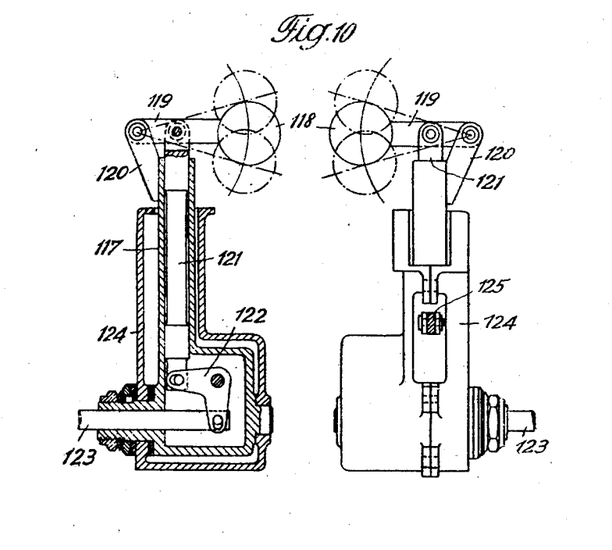
Fig. 10 shows an elevation partly in section of a control portion of the control apparatus for an aircraft with two motors.
Figure 11:
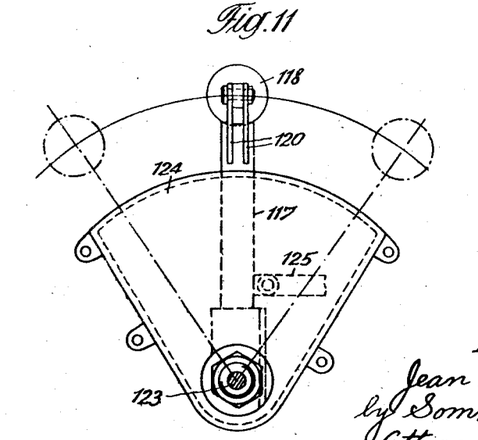
Fig. 11 shows a side elevation of Fig. 10.

In the control portion of a control apparatus for aircraft with two motors, as shown in Figs. 10 and 11, the motor operating levers 117 are constructed in a manner similar to that shown in Fig. 5. The control button 118 of the control lever is not arranged on the motor operating lever 117 directly but on a lever 119 which is pivotally mounted on a support 120 of the lever 117. On one arm of the lever 119 a rod 121 is pivotally connected at one of its ends whereas the other end of this rod is articulated to a bell crank lever 122. This bell crank lever 122 is connected through a rod 123 with the control piston 24 in the same manner as described in connection with Fig. 4. As will be seen from Fig. 10 the two buttons 118 are arranged so close to each other that they can be grasped by one and the same hand at the same time and depressed at the same time. By depressing both buttons 118 the two propellers are adjusted to the same extent and the positioning of the buttons 118 indicates the positioning of the propellers. By depressing the buttons to different extents a greater braking action can be produced by means of one propeller than by means of the other. Further by means of the buttons 118 the motor operating lever 117 can be adjusted in its guide 124 for the purpose of adjusting the throttling member of the motor through the rod 125 in a manner similar to that shown in Fig. 4.

For aircraft with more than two motors the arrangement may be so chosen that pairs of two propellers and motors can be operated conjointly as precedingly described. Obviously each propeller and motor may however be separately operated. Braking action produced by two propellers will suffice in most cases for all practical requirements also in multi-engined aircraft.

The advantage of the control apparatus precedingly described are substantially as follows:

The control for adjusting the propeller into the end positions is considerably simplified. The entire propeller adjusting range can be controlled by a single lever which provides the motor operating lever at the same time, if desired. The pilot need not release the motor operating lever at any time.

The setting of the propeller is indicated to the pilot at any moment in different ways, in the first place, by the automatic pivotal adjustment of the lever and also by the indicating mark on the bar coupled to the motor operating lever. The pilot thus knows at any moment how he should attend to the aircraft and especially to the propeller in the braking position thereof so as to eliminate any risk of damage to the motor or the aircraft or both.

The velocity at which the adjustment into the end position takes place has such a value that this adjustment can be set while the fuel lever is adjusted into any position without involving the risk of the motor running wild. The propeller returns at the same velocity of adjustment back to the normal adjusting range again. The braking can be carried out expeditiously and can be brought to an end rapidly if impediments should suddenly arise. By this means the safety of operation is considerably increased.

In adjusting the propeller into an end position the pilot is able to determine at any time a certain amount of tension being applied to the motor operating lever and is thus reminded of this adjustment. If by inadvertence the motor operating lever is released or the lateral pressure is not counteracted the propeller returns automatically back into position of normal automatic control.

The motor operating lever, if set for automatic control is locked against setting for adjustment into an end position of the propeller so that the pilot cannot set the lever for end position adjustment arbitrarily. This mode of control can be used for different kinds of propellers.

Figures 8, 9:
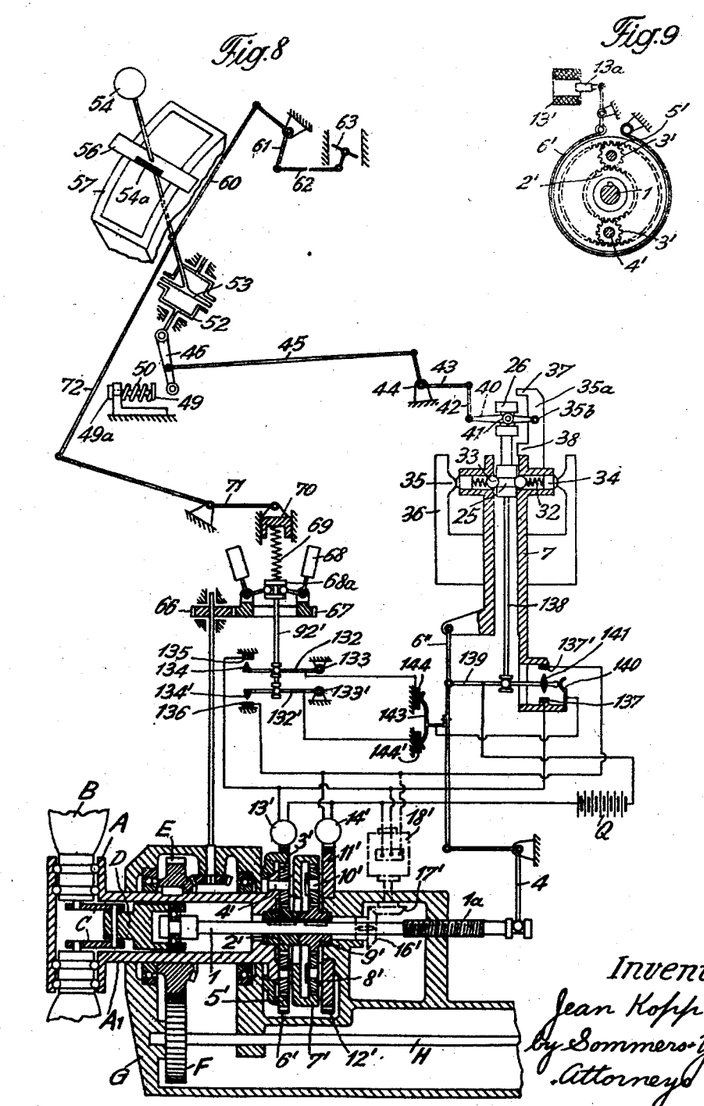
Fig. 8 is a schematic lay-out of another exemplification of the control apparatus.
Fig. 9 is a schematic representation of electrically controlled gearing brake means.

In the exemplification shown in Figs. 8 and 9 the propeller hub is designated by A as in the first exemplification, whereas B refers to the adjustable blades and A1 to the extension of the hub 4 constituting the propeller shaft and mounted in the casing G. The reference character G designates the motor casing or any other suitable mounting casing for the propeller shaft. Reference character H denotes the motor shaft which drives the propeller shaft A1 by means of gears F, E. On the rearward end of shaft A1 a portion of the adjusting device, in the form of an adjusting gearing, is arranged which gearing includes two separate planetary drives. On the adjusting shaft 1 the sun wheel 2' of a first planetary drive is mounted and keyed to the shaft 1. The wheel 2' is in mesh with an intermediate wheel 3' which is rotatably mounted on an axle 4'. The axle 4' is rigidly connected with the propeller shaft A and carries a toothed rim 7' also. The gear 3' is in mesh with a toothed rim 5' which can be braked by means of a brake band 6' while the propeller rotates. The remaining parts of the adjusting device between the adjusting shaft 1 and the propeller blades B are similar to those explained in the description of the first exemplification.

The braking action is generated by an electromagnet 13'. The second planetary drive includes a sun wheel 9', which is also keyed to the adjusting shaft 1, the intermediate gears 8' rotatably mounted on bearing pins 10', and the toothed rim 7'. The pins 10' are fastened to a braking disc 11' which can be influenced by braking action effected by a brake band 12'. The braking action, exerted on the brake band 12' and the brake disc 11' is produced by an electro-magnet 14'. The adjusting shaft 1 carries screw threads 1a interengaging with a screw bore in the casing G. As the shaft 1 rotates the shaft 1 is axially displaced by effect of said screw threads, which displacement results in adjusting the propellers by means such as is illustrated in Fig. 8 and not described in further detail. The gears 2', 9', 16' are so mounted on the shaft 1 that the engagement of the toothed portions is not affected by the axial displacement. The displacing movement of the shaft 1 is transmitted by the bell crank lever 4 to the rod 6" and the adjusting sleeve 7 and thence to the arresting device 34 in the same manner as described in the first exemplification. The action of the rod 45 on the control lever 54 results in adjustment of the lever 54 transversely of the casing 57 of the control lever. The adjustment of the governor is effected by displacement of the lever 54 longitudinally of the casing 57, by the rod 72, and the simultaneous operation of the throttling member of the motor by the rod 60.

The governor is constructed in conventional manner and includes centrifugal weights 68, a spring 69 and an adjusting arm 92'. The governor is directly driven by the propeller or by the motor. The adjusting arm 92' is articulated to two levers 132 and 132' which are fulcrumed on fixed points 133 and 133'. To the lever 132 a contact pin 134 and to the lever 134' a contact stud 134' are connected and either the contact stud 134 or the stud 134' enters into engagement with the contacs 135 and 136 respectively as the governor meets with its movement limiting means. The lever 132 is insulated relative to the fulcrum 133 whereas the adjusting arm 92' is insulated against passage of current. To the adjusting sleeve 7 contacts 137 and 137' are fastened and insulated with respect to the adjusting sleeve 7. The lever 139 is articulately connected to the rod 6" and further to a rod 138 of the arresting device 34. The lever 139 is insulated with respect to the rodwork 4, 6" and the rod 138 against passage of current.

The condition of parts of the control apparatus shown in the drawing corresponds to the propeller adjustment within the automatic adjusting range. In this position of the parts the lever 139 contacts with a contact blade 140 which is also connected with the adjusting sleeve 7 and insulated relative to this sleeve. In shifting the rod 138 in the axial direction the contact pins 141 of the lever 139 move into contacting engagement with the contacts 137 and 137' respectively when the arresting device 134 is released while at the same time the contacting engagement with the contact blade 140 is interrupted.

Further on the rod 6" a contact stirrup is connected in insulated manner which, within the automatic adjusting range, contacts with contact members 144 and 144'.

Electric current for influencing the adjusting of the propeller or for adjusting the latter directly is supplied by a source of current Q which may consist in a battery, or a generator, provided that an electric motor 18' is optionally provided in the apparatus as indicated in chain dotted lines, which motor may also replace the two planetary drives and operate the gears 17' and 16' instead of said drives so as to rotate the adjusting shaft 1 directly by means of said gears.

The operation of the control apparatus shown in Figs. 8 and 9 is as follows:

One pole of the source of current Q is directly connected with the magnets 13' and 14'. The second pole is connected with the lever 139 and by means of contacts 140, 143, 144, 144' with the levers 132 and 132' respectively. If the speed of revolution of the propeller coincides with that speed of revolution to which the governor is set the circuit remains interrupted so that no adjustment takes place and the adjusting gearing is therefore ineffective. If the speed of revolution of the propeller increases above the speed of revolution for which the governor is set, the contact pin 134 contacts with the contact member 135 under the influence of the centrifugal effect of the weights of the governor.

The contact member 135 is connected with the magnet 13' so as to close the circuit of this magnet. Due to electrical energisation the stud 13a (Fig. 9) is drawn into the magnet and the braking band 6' is tightened on the toothed rim 5' which is thus braked. By action of rotation of the propeller the intermediate gear 3' is rotated which in turn rotates the sun wheel 2'. By action of the rotating movement of the sun wheel 2' the shaft 1 is axially displaced and readjusted by means of the screw threads 1a whereby the propeller pitch is increased. As the speed of revolution of the propeller decreases below that for which the governor is set the contact stud 134' contacts with the contact member 136 which is connected with the magnet 14' so that the circuit of this magnet is closed. By action of the magnet 14' the brake disc 11' is braked. By effect of the rotation of the propeller the sun wheel 9' is rotated by the toothed rim 7' and the intermediate gear 8' is rotated in the opposite direction relative to the sun wheel 3'. The propeller is, thus, adjusted in the opposite direction. The adjusting operation is maintained until the speed of revolution of the propeller and that to which the governor is set coincide. As soon as this happens the circuit through the contact pins 134 or 134' respectively is broken and the adjusting is interrupted.

The adjusting movement of the propeller is transmitted from the shaft 1 to the rodwork 4, 6" and to the adjusting sleeve 7. On reaching the limit of the automatic adjusting range the contacting engagement between the contact stirrup 143 and the contact member 144 or 144' is interrupted. Adjustment of the propeller by the governor beyond the automatic adjusting range can no longer take place. Contacting engagement for resetting the propeller in the opposite direction of adjustment is however maintained up to the end of the automatic adjusting range for the purpose of allowing the propeller to be reset by the governor. This contacting engagement is interrupted only when the limit of the automatic adjusting range is passed towards the end position.

The adjusting movement of the propeller is transmitted in the same manner as described in the first exemplification from the adjusting sleeve 7 by the arresting device 34 and the rod 45 to the control lever 54.

In order to adjust the propeller into either of the end positions, for example the braking position, the arresting device 34 is released by lateral pressure on the control lever 54. By means of the rod 138 the contact pin 141 is moved into contact with the contact member 137'. The contact member 137' is directly connected with the magnet 14' and closes the circuit of this magnet. By action of the gearing the propeller is adjusted into the braking position. On arrival in the braking position the control lever 54 bears laterally against the casing 57 after having shared in the adjusting movement of the propeller, whereby the lever indicates the extent of the adjusting movement made. Consequently the arresting device 34 again enters into engagement for the reason that the control lever 54 is incapable of retracting the locking piston from engagement with this device, due to bearing against the casing 57. Contacting engagement between the contact member 137' and the pin 141 is interrupted and the adjusting movement ceases.

The resetting of the propeller from the end position back into the automatic adjusting range and adjustment into the opposed end position, for example the feathered position, is initiated by lateral pressure exerted on the control lever 54 in the opposite direction. The arresting device 34 is again released and, by action of the rod 138, the contact pin 141 is moved into contact with the contact member 137. Electrical circuit is completed at the magnet 13' and the propeller is adjusted into the feathered position by action of the gearing. On arrival in the feathered position further adjusting is made impossible by interruption of the contacting engagement between the stud 141 and the contact member 137 in the same manner as described for the braking position.

For limiting the end positions, alternatively, a contact breaker may be arranged on the rod 6'' for interrupting the current supply, in which arrangement the conductors between the contact member 137' and the magnet 14' and those between the contact member 137 and the magnet 13' would have to be connected with this contact breaker.

In adjusting into the end positions the governor is completely disconnected so as to be entirely ineffective. The same applies to the passage through the automatic adjusting range due to contacting engagement between the lever 139 and the contact stirrup 140 being no longer maintained so that the supply of electric current to the governor is interrupted.

In resetting from the end position into the automatic adjusting range the control lever 54 is no longer pushed aside, that is released, on the automatic range being reached, when the arresting device 34 snaps into engagement, and the governor is adapted to function again. The lateral positioning of the control lever 54 indicates to the pilot at all times how the propeller is set.

The propeller may also be adjusted directly by an electric motor, as indicated in chain dotted lines in Fig. 8, instead of by planetary drives. The electric motor 18' is arranged for rotating in both directions. One of the poles of the motor 18' is directly connected with the source Q of electrical energy. By connecting a second pole with either of the contact members 135 or 137 results in rotation of the motor in one direction, whereas by connecting a third pole with either of the contact members 137' or 136 results in rotation of the motor in the other direction. If the electric motor functions to effect the adjusting directly the source of electric current must supply all the energy required for the propeller adjustment. If the adjusting is effected by planetary drives the energy required for the propeller adjustment can be derived from the propeller itself whereas the source Q of energy merely needs to supply the energy for actuating the gearing. Any suitable kind of adjusting gearing or direct electrical drive may be used.

The entire electrical control system can be united together with the arresting device and the governor as well as the adjusting gearing or with the electric motor into a self-contained unit.

I claim:

1. In control apparatus for variable pitch propeller adjusting devices, a propeller having rotatable blades, a blade pitch adjusting device for said propeller, an electrical actuating equipment including control conductors, said equipment being connected with said adjusting device, a braking position, an automatic blade pitch and a feathered position adjusting range provided in said propeller, a control lever connected with said adjusting device and arranged for influencing said actuating equipment for controlling the blade adjustment throughout all said ranges, by means of electrical energy, and transmission means connected with said control lever and adapted, by its movement of the control lever, for indicating the type and velocity of adjustment of said propeller blades.

2. In a control apparatus for motor driven variable pitch propeller adjusting devices, a propeller having rotatable blades, a blade pitch adjusting device for said propeller, motor actuable gearings in driving association with said adjusting device, means for deriving the energy consumed by said gearing from the driving shaft of the motor for actuating the apparatus, electromagnets for influencing said gearings for obtaining the adjusting movement, a braking position, an automatic blade pitch and a feathered position adjusting range provided in said propeller, a control lever connected with said adjusting device for controlling the blade adjustment throughout all said ranges, and adapted for influencing the circuit through said magnets for realising the obtainment of said adjusting movement, and transmission means connected with said control lever and adapted, by its movement of the control lever, for indicating the type and velocity of adjustment of said propeller blades.

3. In a control apparatus for motor driven variable pitch propeller adjusting devices, a propeller having rotatable blades, a blade pitch adjusting device for said propeller, motor actuable planetary gearings in driving association with said adjusting device, means for deriving the energy consumed by said gearings from the driving shaft of the motor for actuating the apparatus, electromagnets for influencing said gearings for obtaining the adjusting movement, a braking position, an automatic blade pitch and a feathered position adjusting range provided in said propeller, a control lever connected with said adjusting device for controlling the blade adjustment throughout all said ranges, and adapted for influencing the circuit through said magnets for realizing the obtainment of said adjusting movement by producing braking action in said planetary gearings, and transmission means connected with said control lever and adapted, by its movement of the control lever, for indicating the type and velocity of adjustment of said propeller blades.

4. In control apparatus for variable pitch propeller adjusting devices, a propeller having rotatable blades, a blade pitch adjusting device for said propeller, an electrical actuating equipment including an electric motor and control conductors, said equipment electrically connected with said adjusting device and said motor supplying the energy required for effecting the adjusting movement, a braking position, an automatic blade pitch and a feathered position adjusting range provided in said propeller, a control lever connected with said adjusting device and arranged for influencing the circuit through said motor for controlling the blade adjustment throughout all said ranges by means of electrical energy, and transmission means connected with said control lever and adapted, by its movement of the control lever, for indicating the type and velocity of adjustment of said propeller blades.

5. In control apparatus for variable pitch propeller adjusting devices, a propeller having rotatable blades, a blade pitch adjusting device for said propeller, an electrical actuating equipment including control conductors, said equipment electrically connected with said adjusting device, a braking position adjusting range, an automatic governor controlled blade pitch adjusting range and a feathered position adjusting range provided in said propeller, a control lever connected with said adjusting device for controlling the blade adjustment throughout all said ranges by means of electrical energy and adapted for influencing said control conductors by a supplementary movement of said lever for adjusting the end positions of said propeller blades, and transmission means connected with said control lever and adapted, by its movement of the control lever, for indicating the type and velocity of adjustment of said propeller blades.

6. In control apparatus for variable pitch adjusting devices, a propeller having blades rotatable to adjusted positions including a braking position and a feathered position, a blade pitch adjusting mechanism, an automatic blade pitch adjustment control mechanism connected with adjusting mechanism for controlling the pitch within a certain range, a manually operable control lever connected with said automatic control mechanism, means operatively connected to said control lever adapting the latter to influence the control exercised within the automatic range, and further means providing for pivotal movement of said control lever in a direction other than that of its movement in influencing the automatic control mechanism, adapting the latter to take complete control of the adjustment beyond the range of the automatic control, and transmission means interposed between said blade pitch adjusting mechanism and said control lever influencing the position of the latter so as to serve as an indicator of the type of adjustment to which the blades are set, and of the speed of adjustment when operating under automatic control.

7. In control apparatus for variable pitch adjusting devices, a propeller having blades rotatable to adjusted positions including a braking position and a feathered position, an automatic blade pitch adjusting mechanism, an automatic blade pitch adjustment control mechanism, a fluid pipe system including a throttle valve operatively connecting the automatic control mechanism with the adjusting mechanism for controlling the pitch within a certain range, a manually operable control lever connected with said automatic control mechanism, means providing for pivotal movement of said control lever in a direction other than that of its movement in influencing the automatic control mechanism, adapting the latter to influence the control exercised within the automatic range and further means operatively connected to said control lever adapting the latter to take complete control of the adjustment beyond the range of the automatic control, and transmission means interposed between said blade pitch adjusting mechanism and said control lever influencing the position of the latter so as to serve as an indicator of the type of adjustment to which the blades are set, and of the speed of adjustment when operating under automatic control.

8. In control apparatus for variable pitch adjusting devices, a propeller having blades rotatable to adjusted positions including a braking position and a feathered position, a mechanism for adjusting the pitch of the blades, an automatic mechanism operable within a predetermined range for controlling the adjustment of the blade pitch, a fluid transmission system interconnecting the pitch adjusting mechanism and the control mechanism, a manually operable lever, means operatively connected to said control lever adapting the latter to influence the control exercised within the automatic range, further means providing for pivotal movement of said control lever in a direction other than that of its movement in influencing the automatic control mechanism, adapting the latter to take complete control of the adjustment beyond the range of the automatic control, a follow-up valve in said system, said lever being connected with the follow-up valve through pivot means allowing movement in one direction without affecting the other direction, and transmission means interposed between said blade pitch adjusting mechanism and said control lever influencing the position of the latter so as to serve as an indicator of the type of adjustment to which the blades are set, and of the speed of adjustment when operating under automatic control.

9. In control apparatus for variable pitch propeller adjusting devices, a propeller having rotatable blades, a blade pitch adjusting device for said propeller, a braking position, an automatic blade pitch and a feathered position adjusting range provided in said propeller, a shiftable control lever connected with said adjusting device for controlling the blade adjustment throughout all said ranges, and transmission means interposed between said blade adjusting device and said control lever for providing for control of said adjusting device by said lever for braking or feathering pitch adjustment and for pivotally displacing said lever transversely of its direction of shifting when in control of the automatic pitch adjustment setting and for indicating the propeller blade position in the automatic range of pitch change by the corresponding displacement of the control lever without affecting the propeller itself.

JEAN KOPP.

(References on following page)

REFERENCES CITED

The following references are of record in the file of this patent:

UNITED STATES PATENTS

| Number | Name | Date |
|---|---|---|
| 2,179,492 | Caldwell et al. | Nov. 14, 1939 |
| 2,154,887 | Baker | Apr. 18, 1939 |
| 2,343,416 | Keller | Mar. 7, 1944 |
| 2,205,625 | Mader | June 25, 1940 |
| 2,353,566 | Keller | July 11, 1944 |
| 2,244,770 | Englesson | June 10, 1941 |

FOREIGN PATENTS

| Number | Country | Date |
|---|---|---|
| 517,696 | Great Britain | Feb. 6, 1940 |
| 541,839 | Great Britain | Dec. 15, 1941 |
| 703,319 | Germany | Mar. 6, 1941 |
| 217,669 | Switzerland | Apr. 16, 1942 |